(12) United States Patent
Chang et al.

(10) Patent No.: US 9,664,991 B1
(45) Date of Patent: May 30, 2017

(54) PROJECTOR WITH LIGHT POLLUTION SHIELD FUNCTION AND LIGHT POLLUTION SHIELDING METHOD THEREOF

(71) Applicant: Qisda Corporation, Taoyuan (TW)

(72) Inventors: Wei-Chun Chang, New Taipei (TW); Ying-Fang Lin, Taoyuan (TW)

(73) Assignee: Qisda Corporation, Taoyuan County (TW)

( * ) Notice: Subject to any disclaimer, the term of this patent is extended or adjusted under 35 U.S.C. 154(b) by 0 days.

(21) Appl. No.: 15/073,666

(22) Filed: Mar. 18, 2016

(51) Int. Cl.
*G03B 21/20* (2006.01)
*G03B 21/14* (2006.01)

(52) U.S. Cl.
CPC ....... *G03B 21/2053* (2013.01); *G03B 21/142* (2013.01)

(58) Field of Classification Search
CPC .... G03B 21/008; G03B 21/28; G03B 21/142; G03B 21/145; G03B 21/208; H04N 13/0059; H04N 13/0427
See application file for complete search history.

(56) References Cited

U.S. PATENT DOCUMENTS

| | | | |
|---|---|---|---|
| 2004/0080719 A1* | 4/2004 | Morinaga | G03B 21/16 353/61 |
| 2006/0114431 A1* | 6/2006 | Ushiro | H04N 5/74 353/119 |
| 2007/0242236 A1* | 10/2007 | Sugiura | G03B 21/145 353/85 |

* cited by examiner

*Primary Examiner* — Sultan Chowdhury

(57) ABSTRACT

A projector includes a projector body having a light-permissive aperture, a plurality of lens modules, a lens disassembly sensing module, a light-emitting module and a control module. The lens modules are individually provided for an assembly to the light-permissive aperture. The lens disassembly sensing module is disposed in the projector body and corresponding to the light-permissive aperture. The light-emitting module is disposed in the projector body and configured to emit lights toward the light-permissive aperture. The control module is signally connected to the lens disassembly sensing module and the light-emitting module. The control module is configured to sense, through the lens disassembly sensing module, whether any one of lens modules is being disassembled from the light-permissive aperture and modulate a lighting intensity of the light-emitting module when a lens module being disassembled from the light-permissive aperture is sensed. A light pollution shielding method for the projector is also provided.

10 Claims, 6 Drawing Sheets

PROJECTOR WITH LIGHT POLLUTION SHIELD FUNCTION AND LIGHT POLLUTION SHIELDING METHOD THEREOF

FIELD OF THE INVENTION

The present invention relates to a projector with light pollution shielding function and a light pollution shielding method thereof, and more particularly to a projector with light pollution shielding function and a light pollution shielding method thereof capable of preventing a backlight source from continually emitting lights while a lens module is being disassembled from the projector.

BACKGROUND OF THE INVENTION

Currently, the high-end projectors on the market are implemented with multiple lens switchable function, so that a user can purchase one projector only and assembly a particular lens (such as a telephoto lens or short focus lens) into the projector based on the corresponding environment.

In generally, backlight source of high-end projector on the market has a relatively-high illumination; therefore, a user may have his eyes burned by the light with relatively-high illumination when the user directly eyes the projector while switching the lenses of the projector. Thus, to prevent the eyes from being burned by the light with relatively-high illumination, the user must manually turn off the backlight source before switching the lenses. However, turning off the backlight source for each switch of lens is quite bothering process and timing consuming for a user. More seriously, if a user directly disassemblies a lens from the projector without turning off the backlight source in advance, the user may have his eyes burned.

To avoid the aforementioned case, another high-end projector on the market is designed to have a movable light shielding structure, which is disposed at a light-permissive aperture of the projector and for directly covering the light-permissive aperture and thereby automatically blocking the backlight source while a lens is being disassembled from the projector. However, the projector may have a higher cost due to that an additional light shielding structure is required. Further, if an elastic structure (such as a spring) is used for the on/off switch of the movable light shielding structure, a user may still have his eyes burned once the elastic structure has elastic fatigue and cannot completely block the backlight source while switching the lenses.

Therefore, it is quite important to provide a projector capable of automatically blocking the backlight source while a lens is being disassembled from the projector without additional light shielding structure and higher production cost.

SUMMARY OF THE INVENTION

Therefore, one object of the present invention is to provide a projector capable of preventing the eyes of a user from being burned by lights from the backlight source while the user is switching the lenses of the projector.

Another object of the present invention is to provide a projector capable of automatically blocking the backlight source without additional light shielding structure.

Still another object of the present invention is to provide a light pollution shielding method for a projector capable of automatically blocking the backlight source while a user is switching the lenses of the projector.

The present invention provides a light pollution shielding method for a projector. The projector includes a projector body, a plurality of lens modules, a lens disassembly sensing module, a light-emitting module and a control module. The projector body has a light-permissive aperture. The lens modules are individually provided for an assembly to the light-permissive aperture of the projector body. The lens disassembly sensing module is disposed in the projector body and corresponding to the light-permissive aperture. The light-emitting module is disposed in the projector body and configured to emit lights toward the light-permissive aperture. The control module is signally connected to the lens disassembly sensing module and the light-emitting module. The light pollution shielding method includes steps of: a) configuring the control module to sense, through the lens disassembly sensing module, whether any one of the plurality of lens modules is being disassembled from the light-permissive aperture; and b) configuring the control module to modulate a lighting intensity of the light-emitting module when the control module senses that any of the plurality of lens modules is being disassembled from the light-permissive aperture.

The present invention further provides a projector with a light pollution shielding function. The projector includes a projector body, a plurality of lens modules, a lens disassembly sensing module, a light-emitting module and a control module. The projector body has a light-permissive aperture. The lens modules are individually provided for an assembly to the light-permissive aperture of the projector body. The lens disassembly sensing module is disposed in the projector body and corresponding to the light-permissive aperture. The light-emitting module is disposed in the projector body and configured to emit lights toward the light-permissive aperture. The control module is signally connected to the lens disassembly sensing module and the light-emitting module. The control module is configured to sense, through the lens disassembly sensing module, whether any one of the plurality of lens modules is being disassembled from the light-permissive aperture. The control module is further configured to modulate a lighting intensity of the light-emitting module when the control module senses that any of the plurality of lens modules is being disassembled from the light-permissive aperture.

In summary, by using the existing related structures of a projector and using a lens disassembly sensing module to sense whether there is any one lens module being disassembled from a light-permissive aperture, a control module can immediately reduce the illumination of a light-emitting unit and/or change angles of a plurality of micro mirror units to reduce the amount of reflected light, thereby reducing the light-emitting intensity or stopping emitting light. According to the projector with a light pollution shielding function and the light pollution shielding method for a projector of the present invention, light can be automatically shielded without manually switching off the projector and consequentially the eyes of a user are prevented from being burned by the light directly emitted from the light-permissive aperture without any additional light shielding structure. Therefore, the production cost of the projector of the present invention is significantly reduced and the process of shielding light is more convenient and time saving.

For making the above and other purposes, features and benefits become more readily apparent to those ordinarily skilled in the art, the preferred embodiments and the detailed descriptions with accompanying drawings will be put forward in the following descriptions.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
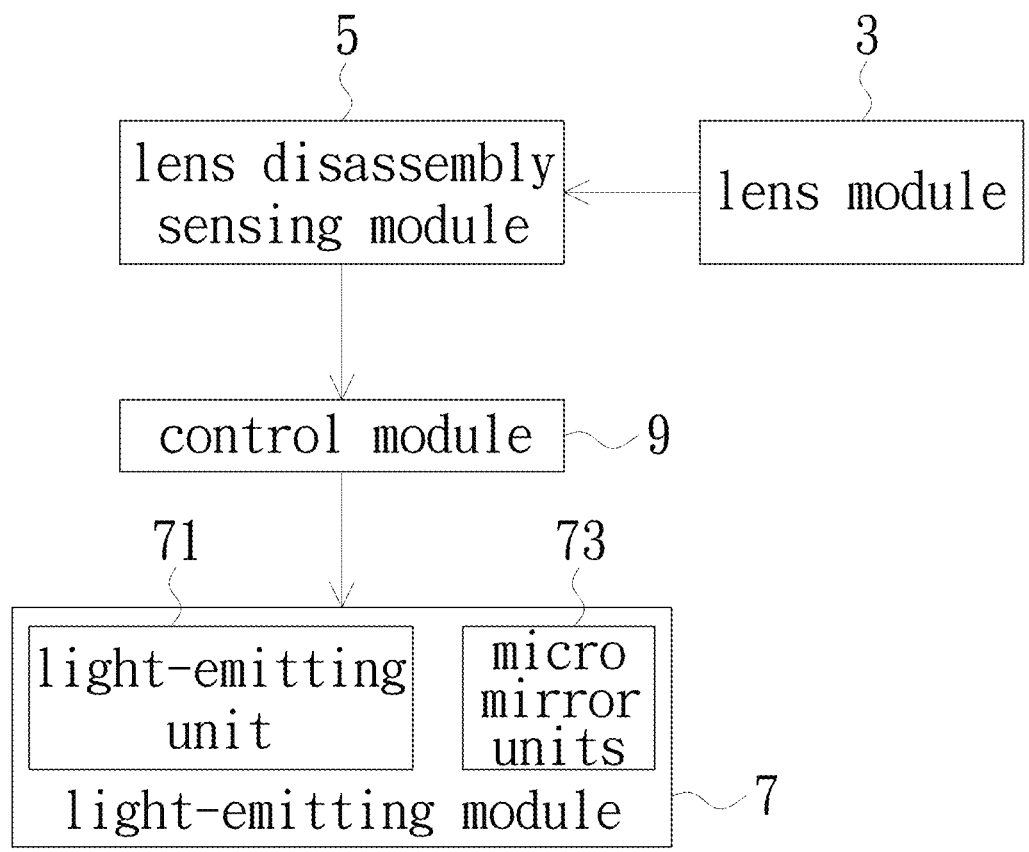
FIG. 1 is a block diagram of a projector with a light pollution shielding function in accordance with an embodiment of the present invention.
Figure 2:
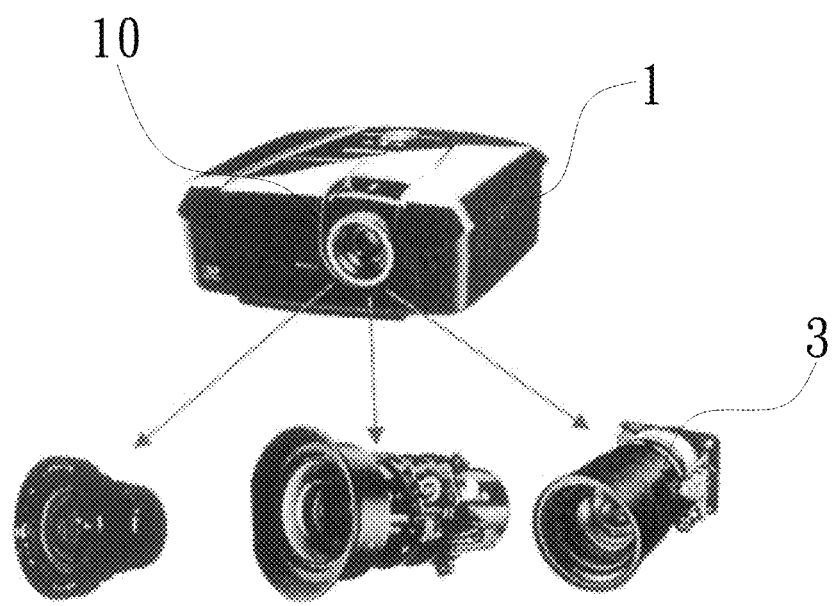
FIG. 2 is a schematic view of the projector shown in FIG. 1.

FIGS. 1 and 2 are block diagram and schematic view of a projector with a light pollution shielding function in accordance with an embodiment of the present invention. As shown in FIGS. 1 and 2, the projector of the present embodiment includes a projector body 1, a plurality of lens modules 3, a lens disassembly sensing module 5, a light-emitting module 7 and a control module 9. The projector body 1 has a light-permissive aperture 10. The plurality of lens modules 3 are individually provided for an assembly to the light-permissive aperture 10 of the projector body 1. The lens disassembly sensing module 5 is disposed in the projector body 1 and corresponding to the light-permissive aperture 10. The light-emitting module 7 is disposed in the projector body 1 and configured to emit lights toward the light-permissive aperture 10. The control module 9 is signally connected to the lens disassembly sensing module 5 and the light-emitting module 7.

Figure 3:
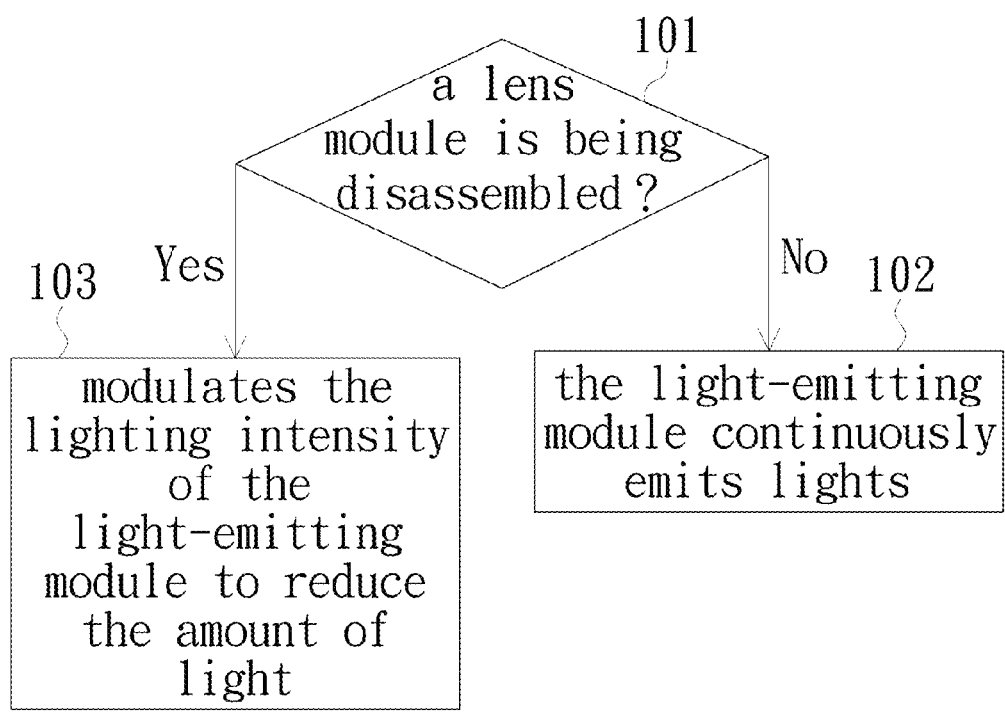
FIG. 3 is a flow chart of a light pollution shielding method for a projector in accordance with an embodiment of the present invention.

FIG. 3 is a flow chart of a light pollution shielding method for a projector in accordance with an embodiment of the present invention. Please refer to FIGS. 1, 2 and 3 together. When the projector is powered on or projecting images, first, the control module 9 senses, through the lens disassembly sensing module 5, whether any one of the plurality of lens modules 3 is being disassembled from the light-permissive aperture 10 (step 101). Then, the light-emitting module 7 continuously emits lights, if no (step 102). Alternatively, the control module 9 modulates the lighting intensity of the light-emitting module 7 to reduce the amount of light, if yes (step 103).

Figure 4:
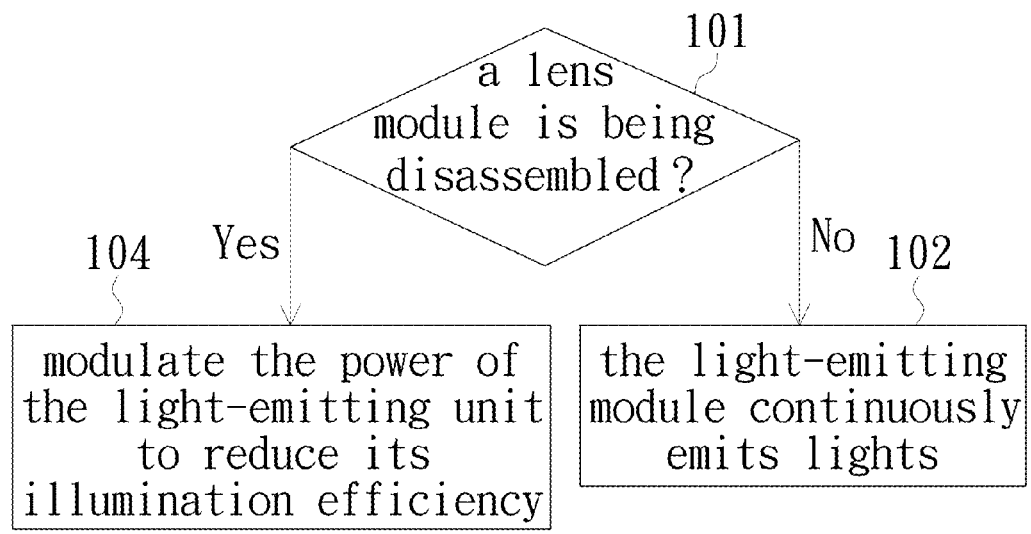
FIG. 4 is a flow chart of a light pollution shielding method for a projector in accordance with another embodiment of the present invention.

FIG. 4 is a flow chart of a light pollution shielding method for a projector in accordance with another embodiment of the present invention. Correspondingly, the light-emitting module 7 in the projector of the present embodiment includes a light-emitting unit 71 powered by electricity as shown in FIG. 1. Please refer to FIGS. 1, 2 and 4 together. In the present embodiment, when the projector is powered on or projecting images, first, the control module 9 senses, through the lens disassembly sensing module 5, whether any one of the plurality of lens modules 3 is being disassembled from the light-permissive aperture 10 (step 101). Then, the light-emitting unit 71 continuously emits lights, if no (step 102). Alternatively, the control module 9 modulates the power of the light-emitting unit 71 to reduce the illumination efficiency of the light-emitting unit 71, thereby modulating the illumination intensity of the light-emitting module 7 to be lower than the illumination intensity corresponding to a normal operation to reduce the amount of light, if yes (step 104).

Figure 5:
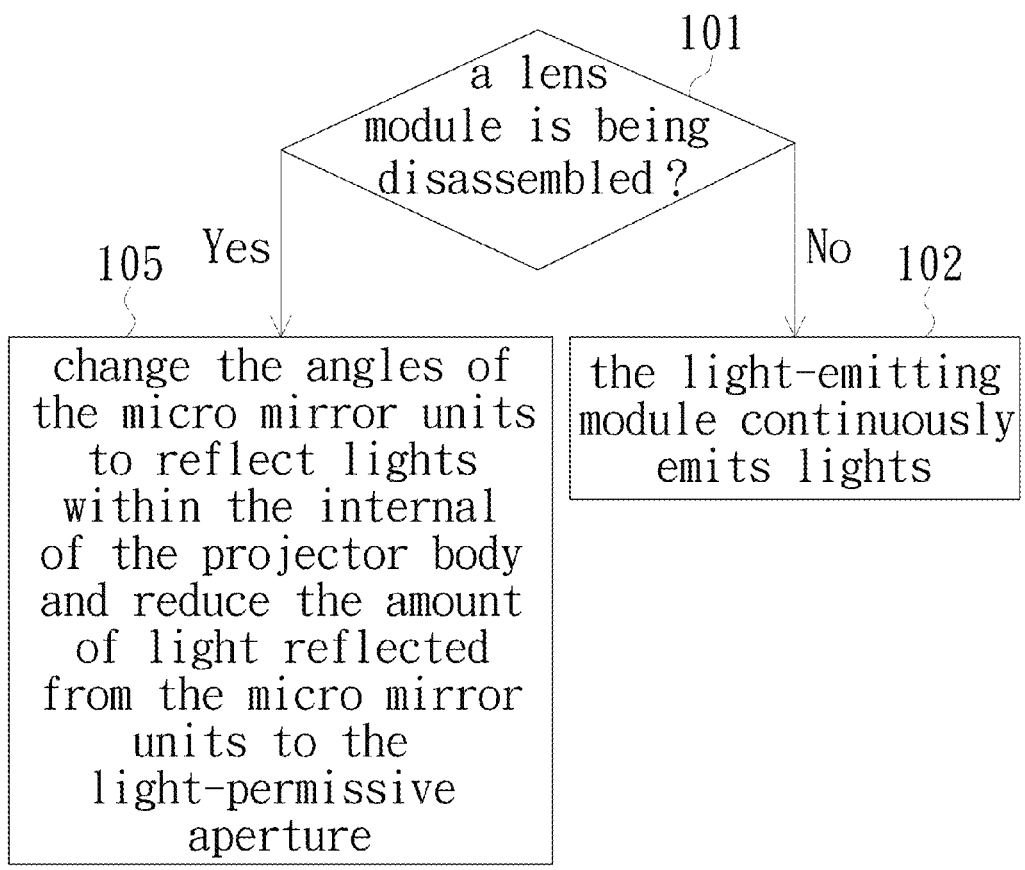
FIG. 5 is a flow chart of a light pollution shielding method for a projector in accordance with another embodiment of the present invention.

FIG. 5 is a flow chart of a light pollution shielding method for a projector in accordance with another embodiment of the present invention. Correspondingly, the light-emitting module 7 in the projector of the present embodiment includes a plurality of micro mirror units 73. The plurality of micro mirror units 73 have respective adjustable angles and are disposed between the light-emitting unit 71 and the light-permissive aperture 10. Please refer to FIGS. 1, 2 and 5 together. In the present embodiment, when the projector is powered on or projecting images, first, the control module 9 senses, through the lens disassembly sensing module 5, whether any one of the plurality of lens modules 3 is being disassembled from the light-permissive aperture 10 (step 101). Then, the light-emitting unit 71 continuously emits lights, if no (step 102). Alternatively, the control module 9 changes the angles of the plurality of micro mirror units 73 to reflect lights within the internal of the projector body 1 and reduce the amount of light reflected from the plurality of micro mirror units 73 to the light-permissive aperture 10, thereby modulating the lighting intensity of the light-emitting module 7, if yes (step 105). To prevent light from being reflected to the light-permissive aperture 10, the plurality of micro mirror units 73 may even be turned off in one embodiment.

For one of ordinary skill in the art, it is understood that when sensing that any one of the plurality of lens modules 3 is being disassembled from the light-permissive aperture 10, the control module 9 may simultaneously reduce the illumination of the light-emitting unit 71 and change the angles of the plurality of micro mirror units 73 to reduce the amount of light reflected by the micro mirror units 73, thereby modulating the lighting intensity of the light-emitting module 7.

Figure 6:
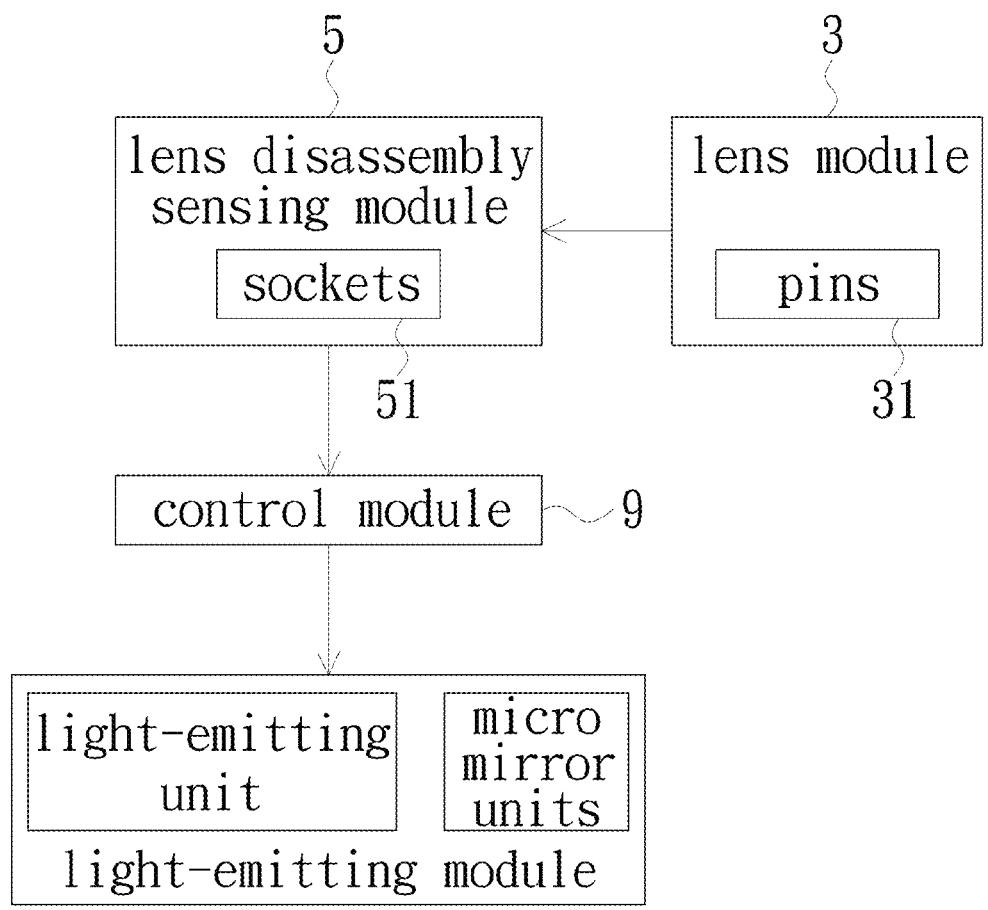
FIG. 6 is a block diagram of a projector with a light pollution shielding function in accordance with an embodiment of the present invention.

FIG. 6 is a block diagram of a projector with a light pollution shielding function in accordance with another embodiment of the present invention. As shown in FIG. 6, in the projector of the present embodiment, each one of the plurality of lens modules 3 includes a set of pins 31 and the lens disassembly sensing module 5 includes a plurality of sockets 51 corresponding to the plurality of sets of pines 31 of the lens modules 3, respectively. Therefore, according to whether the set of pins 31 are inserted into the corresponding sockets 51, the control module 9 can sense an assembly state (e.g., assembled or disassembled) of each one of the plurality of lens modules 3.

In summary, by using the existing related structures of a projector and using a lens disassembly sensing module to sense whether there is any one lens module being disassembled from a light-permissive aperture, a control module can immediately reduce the illumination intensity of a light-emitting unit and/or change angles of a plurality of micro mirror units to reduce the amount of reflected light, thereby reducing the light-emitting intensity or stopping emitting light. According to the projector with a light pollution shielding function and the light pollution shielding method for a projector of the present invention, light can be automatically shielded without manually switching off the projector and consequently the eyes of a user are prevented from being burned by the light directly emitted from the light-permissive aperture without any additional light shielding structure. Therefore, the production cost of the projector of the present invention is significantly reduced and the process of shielding light is more convenient and time saving.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A light pollution shielding method for a projector, the projector comprising a projector body, a plurality of lens modules, a lens disassembly sensing module, a light-emitting module and a control module, the projector body comprising a light-permissive aperture, the plurality of lens modules being individually provided for an assembly to the light-permissive aperture of the projector body, the lens disassembly sensing module being disposed in the projector body and corresponding to the light-permissive aperture, the light-emitting module being disposed in the projector body and configured to emit lights toward the light-permissive aperture, the control module being signally connected to the lens disassembly sensing module and the light-emitting module, and the light pollution shielding method comprising steps of:
   a) configuring the control module to sense, through the lens disassembly sensing module, whether any one of the plurality of lens modules is being disassembled from the light-permissive aperture; and
   b) configuring the control module to modulate a lighting intensity of the light-emitting module when the control module senses that any of the plurality of lens modules is being disassembled from the light-permissive aperture.

2. The light pollution shielding method according to claim 1, wherein the light-emitting module comprises a light-emitting unit powered by electricity, and the step b) further comprises a step of:
   b1) configuring the control module to reduce an illumination of the light-emitting unit thereby modulating the lighting intensity of the light-emitting module.

3. The light pollution shielding method according to claim 1, wherein the light-emitting module comprises a plurality of micro mirror units, the plurality of micro mirror units have respective adjustable angles and are configured to reflect lights toward the light-permissive aperture, the step b) further comprises a step of:
   b2) configuring the control module to change the angles of the plurality of micro mirror units to reduce an amount of light reflected by the plurality of micro mirror units thereby modulating the lighting intensity of the light-emitting module.

4. The light pollution shielding method according to claim 1, wherein the light-emitting module comprises a light-emitting unit powered by electricity and a plurality of micro mirror units, the plurality of micro-mirror units have respective adjustable angles and are configured to reflect lights toward the light-permissive aperture, the step b) further comprises a step of:
   b3) configuring the control module to reduce an illumination of the light-emitting unit and change the angles of the plurality of micro mirror units to reduce an amount of light reflected by the plurality of micro mirror units, thereby modulating the lighting intensity of the light-emitting module.

5. The light pollution shielding method according to claim 1, wherein each one of the plurality of lens modules comprises a set of pins, and the lens disassembly sensing module comprises a plurality of sockets corresponding to the plurality of sets of pins of the plurality of lens modules, respectively, the step a) further comprises a step of:
   a1) configuring the control module to sense an assembly state of each one of the plurality of lens modules according to whether the set of pins are inserted into the corresponding sockets.

6. A projector with a light pollution shielding function, comprising:
   a projector body, having a light-permissive aperture;
   a plurality of lens modules, individually provided for an assembly to the light-permissive aperture of the projector body;
   a lens disassembly sensing module, disposed in the projector body and corresponding to the light-permissive aperture;
   a light-emitting module, disposed in the projector body and configured to emit lights toward the light-permissive aperture; and
   a control module, signally connected to the lens disassembly sensing module and the light-emitting module, wherein the control module is configured to sense, through the lens disassembly sensing module, whether any one of the plurality of lens modules is being disassembled from the light-permissive aperture, wherein the control module is further configured to modulate a lighting intensity of the light-emitting module when the control module senses that any of the plurality of lens modules is being disassembled from the light-permissive aperture.

7. The projector according to claim 6, wherein the light-emitting module comprises a light-emitting unit powered by electricity, and the control module is further configured to reduce an illumination of the light-emitting unit thereby modulating the lighting intensity of the light-emitting module.

8. The projector according to claim 6, wherein the light-emitting module comprises a plurality of micro mirror units, the plurality of micro mirror units have respective adjustable angles and are configured to reflect lights toward the light-permissive aperture, and the control module is further configured to change the angles of the plurality of micro mirror units to reduce an amount of light reflected by the plurality of micro mirror units thereby modulating the lighting intensity of the light-emitting module.

9. The projector according to claim 6, wherein the light-emitting module comprises a light-emitting unit powered by electricity and a plurality of micro mirror units having respective adjustable angles and configured to reflect lights toward the light-permissive aperture, wherein the control module is further configured to reduce an illumination of the light-emitting unit and change the angles of the plurality of micro mirror units to reduce an amount of light reflected by the plurality of micro mirror units, thereby modulating the lighting intensity of the light-emitting module.

10. The projector according to claim 6, wherein each one of the plurality of lens modules comprises a set of pins, and the lens disassembly sensing module comprises a plurality of sockets corresponding to the plurality of sets of pins of the plurality of lens modules, respectively, wherein the control module is further configured to sense an assembly state of each one of the plurality of lens modules according to whether the set of pins are inserted into the corresponding sockets.

* * * * *